United States Patent
Blume

(10) Patent No.: US 6,223,337 B1
(45) Date of Patent: Apr. 24, 2001

(54) RANDOM TEST GENERATION FOR COMPILER OPTIMIZATION

(75) Inventor: William J. Blume, Santa Clara, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/990,064

(22) Filed: Dec. 12, 1997

(51) Int. Cl.[7] .................................................. G06F 9/45
(52) U.S. Cl. ................................................ 717/4; 717/5
(58) Field of Search .................... 395/704, 705; 717/4, 5

(56) References Cited

U.S. PATENT DOCUMENTS

| | | | |
|---|---|---|---|
| 5,396,631 | * 3/1995 | Hayashi et al. ........................ | 717/7 |
| 5,442,790 | * 8/1995 | Nosenchuck ........................... | 717/7 |
| 5,579,520 | * 11/1996 | Bennett ................................. | 717/4 |
| 5,754,860 | * 5/1998 | McKeeman et al. .................... | 717/4 |
| 5,761,510 | * 6/1998 | Smith, Jr. et al. ..................... | 717/4 |
| 5,774,725 | * 6/1998 | Yadav et al. .......................... | 717/4 |
| 5,787,285 | * 7/1998 | Lanning ............................... | 717/4 |
| 5,815,721 | * 9/1998 | Benitez ................................. | 717/9 |
| 5,842,021 | * 11/1998 | Odani et al. ........................... | 717/9 |
| 5,940,618 | * 8/1999 | Blandy et al. ......................... | 717/4 |
| 5,956,512 | * 9/1999 | Simmons et al. ...................... | 717/5 |
| 5,960,197 | * 9/1999 | Segnan ................................. | 717/2 |
| 5,960,202 | * 9/1999 | Granston et al. ....................... | 717/5 |
| 5,974,248 | * 10/1999 | Graef ................................... | 703/22 |
| 6,038,398 | * 3/2000 | Schooler ............................... | 717/9 |

OTHER PUBLICATIONS

Aho et al.; Compilers: principals, techniques, and tools. Addison–Wesley Publishing Company, Reading, MA, Chapter 11, Sep. 1985.*

Tang et al.; "Heap Analysis and Optimizations for Threaded Programs". Proceedings 1997 International Conference on Parallel Architectures and Compilation Techniques, pp. 14–25, Nov. 1997.*

Bacon et al.; "Compiler Transformations for High–Performance Computing". ACM Computing Surveys, vol. 26, No. 4, pp. 346–420, Dec. 1996.*

Austin et al.; "An Ada Program Test Generator". Proceedings of the conference on Ada: today's accomplishments; tomorrow's expectations, pp. 320–325, Oct. 1991.*

Mandl, R.; "Orthogonal Latin Squares: An Application of Experiment Design to Compiler Testing". Communications of the ACM, vol. 28, Iss. 10, pp. 1054–1058, Oct. 1985.*

Bird, D. L., and Munoz, C. U., "Automatic Generation of Random Self–Checking Test Cases", *IBM Systems Journal*, vol. 22, (1983), pp. 229–245.

Burgess, C. J., "The Automated Generation of Test Cases for Compilers," *Software Testing, Verification, and Reliability*, vol. 4, No. 2, (1994), pp. 81–94.

Burgess, C. J., "Towards the Automatic Generation of Executable Programs to Test a Pascal Compiler," Barnes, D. and Brown, P. (eds), *Software Engineering '86*, IEEE Computing Series vol. 6, Peter Peregrinus Ltd., (1986), pp. 304–316.

Burgess, C. J., and Saidi, M., "The automatic generation of test cases for optimizing Fortran compilers", *Information and Software Technology* vol. 38 No. 2, (1996), pp. 111–119.

* cited by examiner

*Primary Examiner*—James P. Trammell
*Assistant Examiner*—Kelvin Booker

(57) ABSTRACT

An optimized compiler is tested. Code segments are stored in a segment file. Each code segment includes a description of an external interface with other segments. A source function is built using the code segments. The source function is compiled using optimization to produce first executable code. The source function is also compiled without using optimization to produce second executable code. The first executable code is executed to produce first results. The second executable code is executed to produce second results. The first results are compared with the second results. An error is reported when the first results differ from the second results.

24 Claims, 2 Drawing Sheets

RANDOM TEST GENERATION FOR COMPILER OPTIMIZATION

BACKGROUND

The present invention concerns compiler optimization and pertains particularly to the use of random test generation to test code generated by an optimizing compilation system.

Programs are generally written in a high level programming language. This high level language, often referred to as source code, is translated by a compiler program into an assembly language. The binary form of the assembly language, called object code, is the form of the code actually executed by a computer. The object code is generally first produced in object code modules. If there is more than one object code module, the object code modules are linked together by a linker. For the purpose of the present application, the term "compile" includes both the process of producing the object code modules and linking the object code modules together.

In order to increase performance of object code when executed by a target computer, compiled code is frequently optimized. As compiler optimizations have been becoming more complex and aggressive, testing these optimizations has become increasingly difficult.

Today's state-of-the-art compilers perform a variety of optimizations to improve the performance of compiled code. See, for example, Aho, A. V., Sethi, R. and Ullman, J. D., *Compiler Principles, Techniques and Tools*, Addison-Wesley (1986). Because of industry pressure for better performing code and faster compilation, there has been a steady growth in the number and complexity of optimizations used by compilers. For example, to avoid the phase ordering problem, multiple optimizations are merged together or a single optimization is implemented in several phases. Optimizations are using more sophisticated analyses, such as register pressure estimates, to identify when an optimization is beneficial. To cut down on compile time, complex data structures are reused across optimizations. Incremental updates are performed to keep this data up to date. Each of these increases in compiler complexity impose an additional risk of defects in the compiler.

Quality is paramount for a production compiler. Bugs in the optimizer often result in incorrectly running compiled code, which is very difficult for an end-user to debug. Also, users of compiler systems respond to compiler bugs by either turning off optimization altogether or moving to a different compiler or platform.

To ensure quality in a production compiler, extensive software design and testing processes are strictly adhered to, including design documents, code reviews, black-box testing, white-box testing, and integration testing. See for example, Beizer, B, *Software Testing Techniques* (2nd edition); Van Nostrand Reinhold (1990), Boujarwah, A and Saleh, K, "Compiler Test Suite: Evaluation and Use in an Automated Test Environment", *Information and Software Technology*, Vol. 36, No. 10, (1994), pp. 607–614; and Myers, G, *The Art of Software Testing*, John Wiley (1979). Despite all this, significant numbers of defects still occur in optimization. Many of these defects are due to subtle interactions between different optimizations or from overlooked corner cases. Writing an exhaustive set of tests that covers all possible cases and interactions between optimizations is impossible given the infinite number of legal source programs as well as the combinatorial number of possible interactions between optimizations.

Automatic test generation is used extensively for testing hardware. Automatic test generators have also been developed to test various kinds of software. For a review of automatic test generation for compilers, see Burgess, C. J., "The Automated Generation of Test Cases for Compilers," *Software Testing, Verification, and Reliability*, Vol. 4, No. 2, (1994), pp. 81–94. Most of the earliest work on automatic test generation concentrated on testing the parser and code generator of compilers. See, Bazzichi, F., and Spadafora, I., "An Automatic Generator for Compiler Testing", *IEEE Transactions on Software Engineering*, Vol. SE-8, No. 4, (1982), pp. 343–353; Celentano, A., Crespi-Reghizzo, S., Della-Vigna, P., Ghezzi, C., Granata, G., and Savoretti, F., "Automatic Generation of Test Cases," *Software Practice and Experience*, Vol. 10, (1980), pp. 897–918; Hanford, K. V., "Automatic Generation of Test Cases," *IBM Systems Journal*, Vol. 9, No. 4, (1970), pp. 242–257; and, Purdom, P., "A Sentence Generator for Testing Parsers," *BIT*, Vol. 12, (1972), pp. 366–375. Such test generators produce random source code from a formal grammar of the source language. The compiled code generated from these random source programs cannot be executed.

Bird, D. L., and Munoz, C. U., "Automatic Generation of Random Self-Checking Test Cases", *IBM Systems Journal*, Vol. 22, (1983), pp. 229–245 disclose some of the earliest work performed in field of automatic generation of executable random tests for compilers. This test generator consists of a loop that randomly selects the next kind of statement to be generated, then invokes a subroutine to produce that statement. Self-checks are inserted into the randomly generated program to ensure that it is producing correct results. Because of this, the test generator must predict the values produced by executing the program. This required restrictions to be made on the control flow behavior of the program. More specifically, iterations of a loop cannot use values produced by other iterations.

A language-independent automatic generator of executable programs was disclosed in Burgess, C. J., "Towards the Automatic Generation of Executable Programs to Test a Pascal Compiler," Barnes, D. and Brown, P. (eds), *Software Engineering '86*, IEEE Computing Series Vol. 6, Peter Peregrinus Ltd., (1986), pp. 304–316. This test generator is driven by a grammar annotated with synthesized and inherited attributes to ensure semantic correctness. The generator predicts the correct values produced by their generated programs and inserts self checks to ensure correctness. To allow the correct prediction of values in a program, all loops are constrained to execute only one iteration.

In Burgess, C. J., and Saidi, M., "The automatic generation of test cases for optimizing Fortran compilers", *Information and Software Technology* Vol. 38 No. 2, (1996), pp. 111–119, a previous test generator was extended to specifically test optimizations. The enhanced test generator delays performing self-check tests on a variable as long as possible, since these self-checks interfere with optimization. This paper also discloses a modified test generator which explicitly produces common subexpressions and induction variables in a randomly generated program.

Seaman, R. P, "Testing high level language compilers", *IEEE Computer System and Technology Conference*, (1974), pp. 6–14, discloses an algorithm which compiles a randomly generated program with two different compilers, executes both versions of the program and compares the results. If the results are different, there must be a bug in one of the compilers.

SUMMARY OF THE INVENTION

In accordance with the preferred embodiment of the present invention, an optimized compiler is tested. Code segments are stored in a segment file. Each code segment includes a description of an external interface with other segments. A source function is built using the code segments. The source function is compiled using optimization to produce first executable code. The source function is also compiled without using optimization to produce second executable code. The first executable code is executed to produce first results. The second executable code is executed to produce second results. The first results are compared with the second results. An error is reported when the first results differ from the second results.

For example, the source function is built by first choosing a code segment to add to the source function which has an output variable which is of a same type as a return value for the source function. Then additional segments are chosen to add to the source function. Each additional segment, when chosen, has an output variable which is of a same type as an undefined variable in the source function. When there are no undefined variables remaining in the source function, the source function is completed. In the preferred embodiment, after a predetermined number of code segments have been added to the source function, only code segments with no input variables are additionally added to the source function.

Also in the preferred embodiment, the external interface for each code segment includes a list of any input, output and local variables used by the code segment. Additionally, a type is indicated for each variable in the list. To simplify construction of the source function, each code segment has exactly one output variable.

Various enhancements are added in different embodiments of the present invention. For example, a subset of the code segments may include a segment function which acts as a subsegment. Each segment function includes as arguments any input and output variables for the segment function.

Also code segments can include header segments. In various embodiments of the present invention, scoping constraints are added to a subset of the code segments include scoping constraints. Further, in order vary the likelihood of each code segment being used, the code segments are assigned weights which vary a likelihood of each segment being used. A subset of the code segments include arrays as input variables.

The present invention provides for an efficient and effective way for random testing of an optimized compiler.

DESCRIPTION OF THE PREFERRED EMBODIMENT

Figure 1:
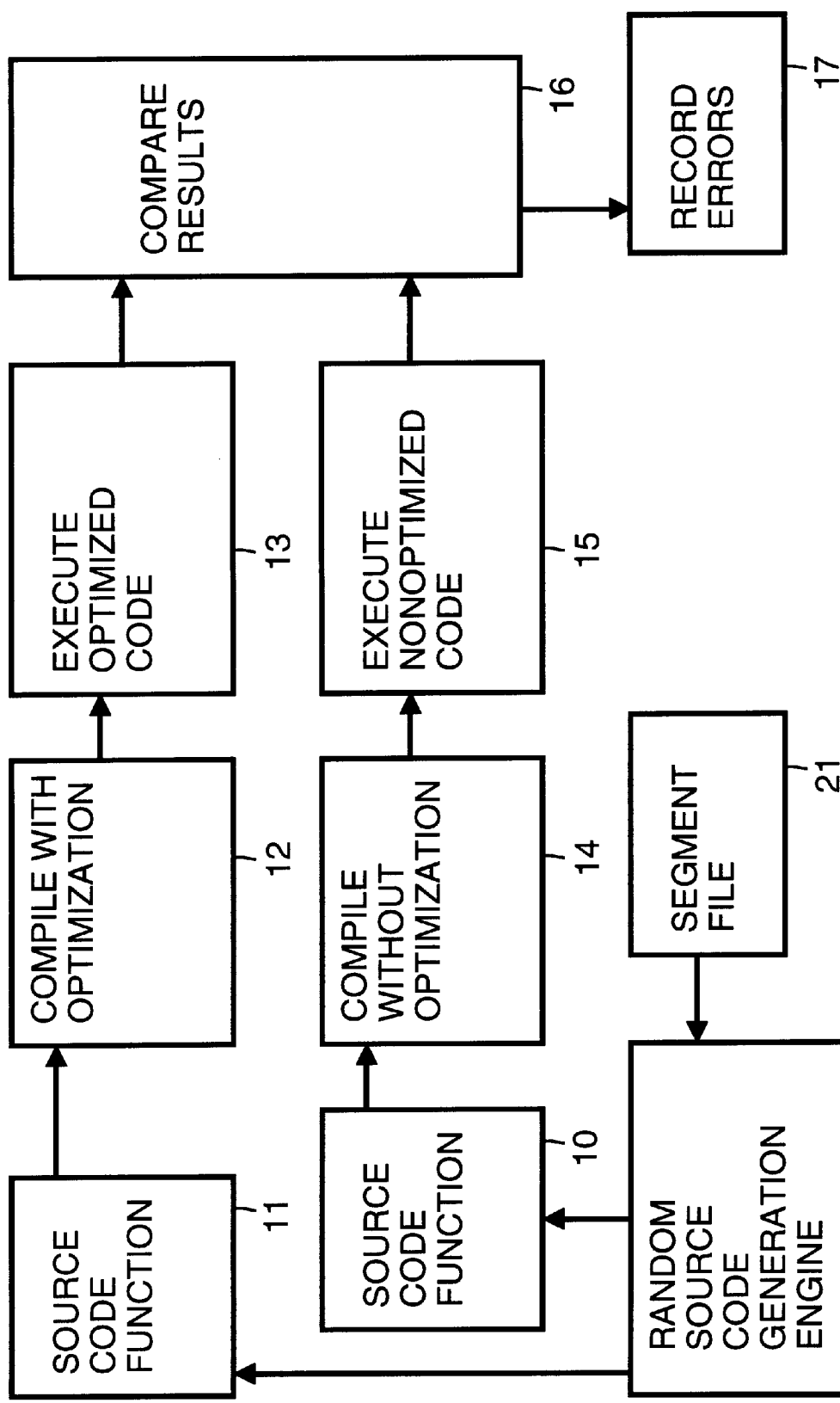
FIG. 1 shows a block diagram of a testing system in accordance with a preferred embodiment of the present invention.

FIG. 1 shows a block diagram of a compiler testing system in accordance with a preferred embodiment of the present invention. A random source code generator engine 20 uses code segments in a segment file 12 to generate identical source code function 11 and source code function 10. As illustrated by blocks 12 and 13, source code function 11 is compiled with optimization and the produced optimized code is executed. Also, as illustrated by blocks 14 and 15, source code function 10 is compiled without optimization and the produced nonoptimized code is executed. As illustrated by a block 16, the results of each execution are compared and, as illustrated by a block 17, the errors are recorded. Using the preferred embodiment, thousands of tests can be generated, compiled and run in this manner in under an hour.

Random source code generator engine 20 works by randomly generating source code function 11 and source code function 10. The rules on how to randomly generate source code function 11 and source code function 10 is stored in segment file 21. Segment file 21 describes the grammar of the language for which to generate random programs, and contains constraints to ensure correctness. In the preferred embodiment, segment file 21 allows one to generate specific code sequences, allowing the user to stress a single component or phase.

To maximize the usefulness of random source code generator engine 20, there are several requirements on the type of random functions that random source code generator engine 20 can generate. First, random source code generator engine 20 is able to generate executable functions, since the majority of compiler defects only show up in the execution of the compiled programs. Second, the executable functions return a comparable result, so that it is possible to differentiate between correctly running and incorrectly running functions. Third, the executable functions are deterministic, so that their results won't vary with optimization. For example, undefined variables are allowed. Fourth, the generated functions have some resemblance to actual user code. This means, for example, avoiding sequences that are common in random code but uncommon in real programs, such as large amounts of unreachable or dead code. Finally, random source code generator engine 20 provides an ability to easily restrain or extend the kinds of random code it generates, so that a user can specialize it to test one particular optimization phase or extend it to handle new cases.

In the preferred embodiment, random source code generator engine 20 is small and relatively language-independent. This allows for maximum flexibility. All language specific syntax or semantics is placed in segment file 21.

Segment file 21 tells random source code generator engine 20 how to generate a random function. More specifically, segment file 21 contains a collection of code snippets called segments. Random source code generator engine 20 generates a random function by generating a random sequence of these segments. To ensure that random source code generator engine 20 generates a deterministic, executable function, each segment in segment file 21 is annotated with input and output information so to ensure that a valid sequence of segments is generated. Some examples of segments are shown in Table 1 below:

TABLE 1

Segment a:

INPUT:      float z
    BEGIN
        z = 1.0;
    END

Segment b:

OUTPUT:    int z
    BEGIN
        z = 2;
    END

Segment c:

INPUT:      float x
    OUTPUT:    int z
    BEGIN
        z = (int)x;
    END

Segment d:

INPUT:      int x
    INOUT:     float z
    BEGIN
        z += z;
    END

Segment e:

INPUT:      float, float y
    OUTPUT:    float z
    LOCAL:     int t
    BEGIN
        t = (int)(x+y);
        z = (float)t;
    END A segment consists of a snippet of legal source code enclosed by BEGIN/END markers. The legal source code is preceded by one or more special statements which name the input, output, inout, and local variables of the code snippet. The four possible special statements are INPUT, OUTPUT, INOUT, and LOCAL. The type of each variable is declared in each special statement. In the preferred embodiment, a variable can occur in only one of these statements and at most once in that statement. Also in the preferred embodiment, each segment is required to have either exactly one output variable or one inout variable. This restriction eases the implementation of the algorithm for random source code generator engine 20.

The special statements are needed for several purposes. First, the special statements describe all the variables used within the segment. This allows random source code generator engine 20 to rename these variables to avoid name clashes between segments. Second, the special statements describe the interfaces of the segment. That is, the special statements describe what variables are produced or consumed by the segment, so that it can ensure that other segments would consume or produce these variables, so as to avoid generating programs with undefined variables or dead code. Inout variables are treated as both input and output variables. Third, the type specified for each variable is used to ensure that there are no type mismatches of variables shared across two or more segments. The type is also used by Random source code generator engine 20 to generate the type declarations for the variables.

Figure 2:
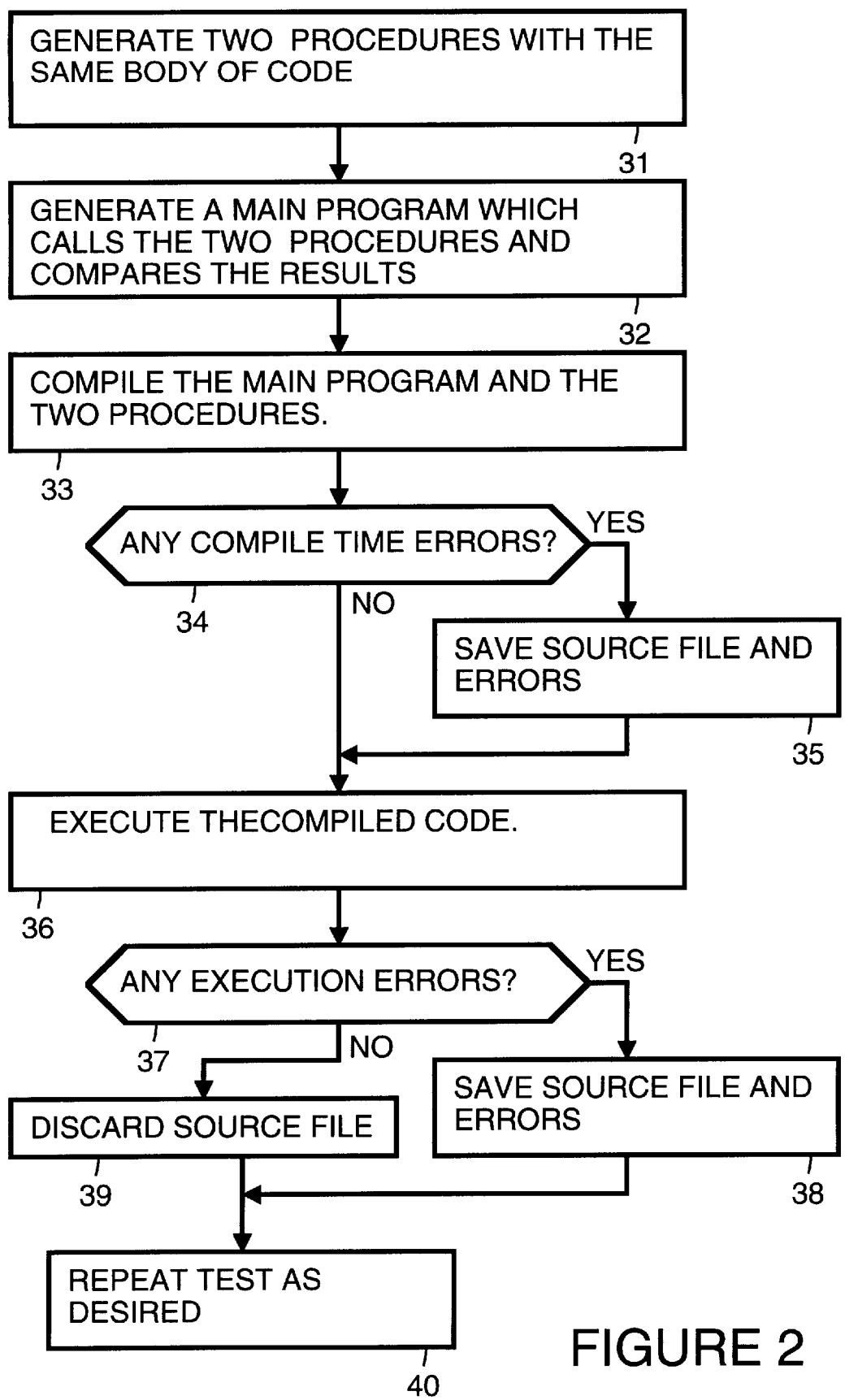
FIG. 2 is a flowchart which summarizes the testing performed by the testing system shown in FIG. 1 in accordance with a preferred embodiment of the present invention.

FIG. 2 shows the testing as orchestrated by random source code generator engine 20. In a step 31, two procedures with the same body of code are generated. The body is generated via the generate_func_body( ) algorithm shown below in Table 2. Compiler pragmas are also generated to enable optimization for one of the procedures and to disable optimization for the other. This step can be repeated many times to generate many tests in a single source file.

In a step 32, the main program is generated. The main program calls each pair of procedures generated earlier and compares their results. If they differ. An error message is printed out.

In a step 33, the generated source file is compiled. In a step 34 it is determined whether any compile-time errors occurred. If so, in a step 35, the source file and the errors are saved.

In a step 36, the compiled source file is executed. In a step 37 it is determined whether any failures occurred during execution. If so, in a step 38, the source file and errors are saved. If there were no errors detected, in a step 39 the source file is discarded.

In a step 40, the test may be repeated as often as desired. For example, the test may be repeated using either the same or a different segment file.

Table 2 below shows the basic algorithm (generate_func_body( )) for generating a random procedure used by random source code generator engine 20.

TABLE 2

```
function generate_func_body( )
    v = new_var("_retval", int)
    U = P = {v}
    code = "return _retval;\n"
    n = 0
    while (U != {}) do
        v = pop(U)
        s = choose_a_segment(v->type, n)
        b = copy of s->body
        b = rename_var(b, s->output, v)
        if (s->has_inout) then U = union(U, {v})
        for each x in union(s->inputs, s->locals) do
            y = new_var(new_name(x), x->type)
            b = rename_var(b,x,y)
            if(x is in s->inputs) then U = union(U, {y})
            P = union(O, {y})
        end for
        code = b . code
        n = n + 1
    end while
    for each z in P do
        code = z->type . "". z. ";\n". code
    end for
    return code
end function
```

As shown by the algorithm in Table 2, random source code generator engine 20 generates code for a function body from the bottom-up, starting with the return statement of the function. Random source code generator engine 20 first generates a statement that returns the return-value (_retval). Random source code generator engine 20 then inserts the return value (_retval) into the set of undefined variables (U) and the set of procedure-local variables (P). Random source code generator engine 20 then enters the main loop of the algorithm, which iterates until there are no more undefined variables. For each iteration of the loop, random source code generator engine 20 removes a variable (v) from the set of undefined variables (U), chooses a segment that defines that variable's type, and prints out that segment after some renaming. More specifically, the first step is to choose a segment whose output variable has the same type as the undefined variable. (The algorithm for choosing a segment is set out in Table 3 below). If the segment's output variable is an inout variable, the variable is put back into the set of undefined variables (U). Random source code generator engine 20 then makes a copy of the segment's body and renames all occurrences of the segment's output variable in the copy of its body to be the undefined variable (v). Finally, the iteration must handle all the input and local variables in the segment. For each input and local variable (x), Random source code generator engine 20 comes up with a new, unique name for the variable (y) and renames that variable (x) to its new name (y). Random source code generator engine 20 also adds the new variable to the set of procedure local variables (P) and if the variable is an input variable, to the set of undefined variables (U) as well. When the while loop finishes, the algorithm generates a declaration for each procedure local variable.

Table 3 below sets out an algorithm (choose_a_segment( )) by which random source code generator engine 20 chooses a segment.

TABLE 3

```
function choose_a_segment(type t, int n)
    if (n <= max_internal_segs) then
        S = all segments
    else
        S = all segments s with no input nor inout variables
    end if
    S = intersection of S and all segments with output type t
    if (S == {}) then abort
    return some random segment in S
end function
```

The algorithm shown in Table 3 takes two arguments: the desired type for the output variable of the to-be-chosen segment (t), and the number of segments generated so far (n). If n is less than the maximum number of allowed internal segments, (i.e., segments with inputs), the algorithm simply returns some random segment whose output variable type is t. However, if n exceeds the maximum number of allowed internal segments, the algorithm imposes the additional constraint that the returned segment has no input nor inout variables. This was done to prevent the algorithm from generating a random program with potentially infinite number of segments, thus ensuring that the algorithm terminates. If for some reason, random source code generator engine 20 cannot find a segment with the imposed constraints on input and output variables, random source code generator engine 20 generates an error and aborts.

Table 4 below sets out an example procedure generated by random source code generator engine 20 using the segments set out in Table 1 above and the algorithms set out in Table 2 and Table 3 above:

TABLE 4

```
#pragma OPT_LEVEL 0
int test_1( ) {
    float v5;
    float v4
    float v3
    int v2;
    float v1;
    int _retval;
    v5 = 1.0;
    v4 = 1.0;
    v3 = (int)(v4 + v5);
    v1 = (float)v3;
    v2 = 2
    v1 += v2;
    _retval = (int)v1;
    return _retval;
}
#pragma OPT_LEVEL 2
int test_opt_1( ) {
```

TABLE 4-continued

```
    float v5:
    float v4
    float v3
    int v2;
    float v1;
    int _retval;
    v5 = 1.0;
    v4 = 1.0;
    v3 = (int)(v4 + v5);
    v1 = (float)v3;
    v2 = 2;
    v1 += v2;
    _retval = (int) v1;
    return _retval;
}
void main( ) {
    if (test_1( ) != test_opt_1( ))
        printf("Test 1 failed.");
}
```

Random source code generator engine 20 begins by generating the statement "return _retval" and inserting the variable _retval in the set of undefined variables and the set of procedure local variables. Random source code generator engine 20 then enters the main while loop of function generate_func_body( ). This iterates until there are no more undefined variables. On the first iteration, the loop removes _retval from the set of undefined variables. Function generate_func_body( ) then calls choose_a_segment( ) with the type of _retval (int) and the number of segments generated so far (0). Now since the number of segments generated so far is less than the maximum number of internal segments, (for example, max_internal_segs is 3 for this example), function choose_a_segment( ) can use either segment (b) or segment (c). For example, segment (c) is randomly chosen from these two segments and returned. Next, random source code generator engine 20 renames the output variable z of the segment's body ("z=(int) x;") to _retval, then renames the input variable x to new variable v1. Random source code generator engine 20 then adds v1 to the set of undefined variables and the set of procedure-local variables. At the end of the iteration, the updated text of the segment's body is prepended to the start of the procedure's body. This process continues until there are no more undefined segments. Termination is guaranteed since after max_internal_segs number of segments are generated, the routine choose_a_segment( ) restricts the set of legal segments to either segment (a) or (b). Once there are no more undefined variables, random source code generator engine 20 inserts a declaration for each procedure-local variable and returns.

In an alternative embodiment of the present invention, random source code generator engine 20 is extended to randomly generate control flow.

To support control flow, a new SEGMENT( ) function is added to segment file 21 syntax. The SEGMENT( ) function is a subsegment which is used in the body of a segment to indicate locations where random source code generator engine 20 should insert randomly generated code. When a segment's body is added to the code of the random program, all SEGMENT( ) functions in that body are replaced with randomly generated sequences of segments. This allows random source code generator engine 20 to generate random, structured control flow without needing explicit knowledge on how specific control flow constructs work.

Some examples of uses of the SEGMENT( ) functions are set out in Table 5 below.

TABLE 5

Segment a:

```
INPUT:     int x, int i
OUTPUT:    int j
BEGIN
    if (x) {
        SEGMENT(IN i, OUT j);
    } else {
        SEGMENT(IN i, OUT j);
    }
END
```

Segment b:

```
INPUT:     float x, int n
OUTPUT:    float z
LOCAL:     int i, float y
BEGIN
    for (i = 0; i < n; ++i) {
        SEGMENT(IN i, IN x, OUT y);
        z += y;
    }
END
```

The SEGMENT( ) function takes several arguments, which describe the variables to be used or defined by the random code sequence that will replace the SEGMENT( ) function. Each argument of a SEGMENT( ) function is prepended by an IN, OUT, or INOUT keyword, so to identify if the given variable is to be used, defined, or used and modified.

The algorithm for generating random code for a SEGMENT( ) function is similar to the algorithm set out in Table 2, but with a few modifications. At the start of the algorithm, all OUT and INOUT arguments are placed in the undefined variable set. Also, whenever a new segment is chosen, before putting all input and inout variables of that segment in the undefined set, an attempt is made to match the input and inout variables with all unmatched IN and INOUT arguments. If an input/inout variable is the same type as an unmatched IN/INOUT argument, that variable is matched with the argument, the variable is renamed to the IN/INOUT argument's name, and the variable is not placed in the undefined variable set. If max_internal_segs number of segments is not generated yet, some random subset of the segment's input variables are purposely not matched to the IN arguments, so to encourage longer random code sequences. Occasionally, copies are inserted to resolve naming conflicts of INOUT arguments, where the names of the input and output variables matched with the INOUT argument do not match.

The algorithm for choosing a segment, set out in Table 3 is modified to handle control flow. First, when more than max_internal_segs have been generated, instead of using segments with no inputs, the algorithm only uses the segments whose input variable's can match the unmatched IN arguments, (i.e., there are no more input variables of a particular type than the number of unmatched IN arguments of that type). Also, any segments containing a SEGMENT( ) function are not allowed when there are more than max_internal_segs segments. This is to prevent the algorithm from generating programs with infinitely deep nesting of control flow.

One issue with the above modifications to handle SEGMENT( ) functions is that it is possible for the algorithm to generate random code sequences for a SEGMENT( ) function that do not use all the IN arguments. Although this does not result in incorrectly running programs, it is undesirable since it can result in a lot of dead code. This issue is partially remedied by extending the algorithm for choosing a segment to perform some lookahead to identify specific candidates. This technique is not foolproof, but it does make it less likely for unresolved IN arguments to occur.

Other preferred embodiments of the present invention include extensions that are added to random source code generator engine 20 to improve its usefulness. For example, header segments are used. This allows specification of code in the header of a randomly generated program so that it is possible to specify global variables, constants, and type declarations.

Also random number/token generators are used to cut down on the number of segments that need to be written in order to specify some random range of numbers, (e.g., from −2 to 2) or some random token, (e.g., '+', '−', '*', '/').

Also, in various embodiments of the present invention, segments are assigned weights to make the segments more or less likely to be used.

Further, multiple input (INM) arguments and multiple input/output (INOUTM) arguments of SEGMENT functions are provided for. This allows certain input to be used multiple times, (e.g., the induction variable of a loop or array types). To allow this, the two additional qualifiers for SEGMENT function arguments (IN and INOUTM) are added.

Also scoping constraints are used. The scoping constraints restrict the places where a segment can be used to particular instances of SEGMENT functions. For example, if a segment uses the break statement in C, the use of that segment is restricted to loop or switch bodies. To allow this, segments are labeled with a particular scope type and specific SEGMENT( ) functions are labeled with that type. Also global (SGLOBAL) variables are used.

Random source code generator engine 20 can be used to generate random loops with arrays accesses. A simplified example of segments random source code generator engine 20 uses to generate random code with arrays is shown in Table 6 below:

TABLE 6

Segment a:

```
HEADER
BEGIN
    typedef int_array int[100];
    typedef index int;
END
OUTPUT:    int_array x
LOCAL:     index i;
BEGIN
    for (i = 0; i < 100; ++i)
        x[i] = rand( );
END
```

Segment b:

```
INPUT:     int_array x
OUTPUT:    int z
LOCAL:     index i;
BEGIN
    z = 0;
    for (i = 0; i < 100; ++i)
        z = z*3 + x[i];
END
```

Segment c:

```
INPUT:     int_array x
INOUT:     int_array y
```

TABLE 6-continued

```
LOCAL:      index i
OUTPUT:
BEGIN
    for (i = 0; i < 100; ++i) {
        SEGMENT(INM i, IN x, INOUT y);
    }
END
Segment d:

INPUT:      index i, int_array x
INOUT:      int_array y
BEGIN
    y[i] = y[i] * RND(-2:2) + x[i]*RND(-2:2);
END
```

Table 7 shows an example of random code random source code generator engine 20 generates from the segments shown in Table 6 above.

TABLE 7

```
typedef int_array int[100];
typedef index int;
int test_1( ) {
    index i1, i2, i3, i4, i5;
    int_array x1, x2, x3;
    int _retval;
    _retval = 0;
    for (i5 = 0; i5 < 100; ++i5)
        x2[i5] = rand( );
    for (i4 = 0; i4 < 100; ++i4)
        x1[i4] = rand( );
    for (i2 = 0; i2 < 100; ++i2) 55
        for (i3 = 0; i3 < 100; ++i3)
            x3[i3] = rand( );
        x1[i2] = x1[i2] *-1 + x3[i2]*-2;
        x1[i2] = x1[i2] *2 + x2[i2]*1;
    }
    for (i1 = 0; i1 < 100; ++i1)
        _retval = _retval*3 + x1[i1];
    return _retval;
}
int test_opt_1( ) {
    (Same source code as test_1( ))
}
int main( ) {
    if (test_1( ) != test_opt_1( ))
        printf("Test 1 failed\n");
}
```

In the example shown in Table 7 above, a new type called int_arrays is declared in the header segment of the algorithm shown. Header segments are described above. The new type called int_arrays declares an integer array. By doing this, arrays can be used as inputs, outputs and local variables in segments.

Also, in the header segment there is declared a new type called index to hold the array index. A special type for array indices is declared so that array index variables can be specified as inputs or outputs of segments without the worry of out-of-bounds errors. Also, a segment is included that collapses an array to a single checksum integer so that all of the elements of an array can contribute to the return value of the procedure. With careful design of the segment file 21, more complex examples can be generated with multidimensional arrays, multiply nested loops, complex array indexing, and other characteristics of array intensive programs.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A computer implemented method for testing an optimized compiler comprising the following steps:
   (a) storing code segments, each code segment including a description of an external interface with other code segments;
   (b) building a source function that consists of a sequence of at least two of the code segments;
   (c) compiling the source function using optimization to produce first executable code;
   (d) compiling the source function without using optimization to produce second executable code;
   (e) executing the first executable code to produce first results;
   (f) executing the second executable code to produce second results;
   (g) comparing the first results with the second results; and,
   (h) reporting an error when the first results differ from the second results.

2. A computer implemented method as in claim 1 wherein in step (a) the external interface for each code segment includes a list of any input, output and local variables used by the code segment.

3. A computer implemented method as in claim 2 wherein in step (a) a type is indicated for each variable in the list.

4. A computer implemented method as in claim 2 wherein step (b) includes the following substeps:
   (b.1) choosing a code segment to add to the source function which has an output variable which is of a same type as a return value for the source function; and,
   (b.2) choosing additional segments to add to the source function, each additional segment when chosen having an output variable which is of a same type as an undefined variable in the source function, step (b) being completed when there are no undefined variables remaining in the source function.

5. A computer implemented method as in claim 4 wherein in substep (b.2) after a predetermined number of code segments have been added to the source function, only code segments with no input variables are additionally added to the source function.

6. A computer implemented method as in claim 1 wherein in step (a) each code segment has exactly one output variable.

7. A computer implemented method as in claim 1 wherein in step (a) a subset of the code segments each include a code segment function which acts as a subsegment.

8. A computer implemented method as in claim 7 wherein in step (a) each segment function includes as arguments any input and output variables for the segment function.

9. A testing system for an optimized compiler, the testing system including:
   a segment file in which is stored code segments, each code segment including a description of an external interface with other code segments; and,
   a source code generator engine, the source code generator engine overseeing the following functions:
      building of a source function that consists of a sequence of at least two of the code segments,
      compiling of the source function using optimization to produce first executable code, compiling of the source function without using optimization to produce second executable code, executing the first executable code to produce first results, executing the second executable code to produce second results, comparing the first results with the second results, and indicating an error with the first results differ from the second results.

10. A testing system as in claim 9 wherein the external interface for each code segment includes a list of any input, output and local variables used by the code segment.

11. A testing system as in claim 10 wherein a type is indicated for each variable in the list.

12. A testing system as in claim 10 wherein step when building the source code function, the source code generator engine:

chooses a code segment to add to the source function which has an output variable which is of a same type as a return value for the source function; and, chooses additional segments to add to the source function, each additional segment when chosen having an output variable which is of a same type as an undefined variable in the source function, the choosing of additional segments being completed when there are no undefined variables remaining in the source function.

13. A testing system as in claim 9 wherein after source code generator engine has added a predetermined number of code segments to the source function, the source code generator engine additionally adds only code segments with no input variables to the source function.

14. A testing system as in claim 9 wherein each code segment has exactly one output variable.

15. A testing system as in claim 9 wherein a subset of the code segments each includes a segment function which acts as a subsegment.

16. A testing system as in claim 14 wherein each segment function includes as arguments any input and output variables for the segment function.

17. A computer implemented method for building a source function for testing an optimized compiler, the computer implemented method comprising the following steps:

(a) storing code segments, each code segment including a description of an external interface with other code segments; and, (b) building the source function using the code segments, including the following substeps:

(b.1) choosing a code segment to add to the source function which has an output variable which is of a same type as a return value for the source function, and (b.2) choosing additional segments to add to the source function, each additional segment when chosen having an output variable which is of a same type as an undefined variable in the source function, step (b) being completed when there are no undefined variables remaining in the source function.

18. A computer implemented method as in claim 17 wherein in substep (b.2) after a predetermined number of code segments have been added to the source function, only code segments with no input variables are additionally added to the source function.

19. A computer implemented method as in claim 17 wherein in step (a) each code segment has exactly one output variable.

20. A computer implemented method as in claim 17 wherein in step (a) a subset of the code segments each includes a segment function which acts as a subsegment.

21. A computer implemented method as in claim 17 wherein in step (a) the code segments include header segments.

22. A computer implemented method as in claim 17 wherein in step (a) a subset of the code segments include scoping constraints.

23. A computer implemented method as in claim 17 wherein in step (a) the code segments are assigned weights which vary a likelihood of each code segment being used.

24. A computer implemented method as in claim 17 wherein in step (a) a subset of the code segments include arrays as input variables.

* * * * *

UNITED STATES PATENT AND TRADEMARK OFFICE
CERTIFICATE OF CORRECTION

PATENT NO.    : 6,223,337 B1
DATED         : April 24, 2001
INVENTOR(S)   : Blume It is certified that error appears in the above-identified patent and that said Letters Patent is hereby corrected as shown below:

Column 5,
Line 23, delete "z += z" and insert therefor -- z += z --

Column 6,
Line 5, delete "differ. An" and insert therefor -- differ, an --

Signed and Sealed this

Twentieth Day of May, 2003

JAMES E. ROGAN
*Director of the United States Patent and Trademark Office*